Patented Apr. 15, 1952

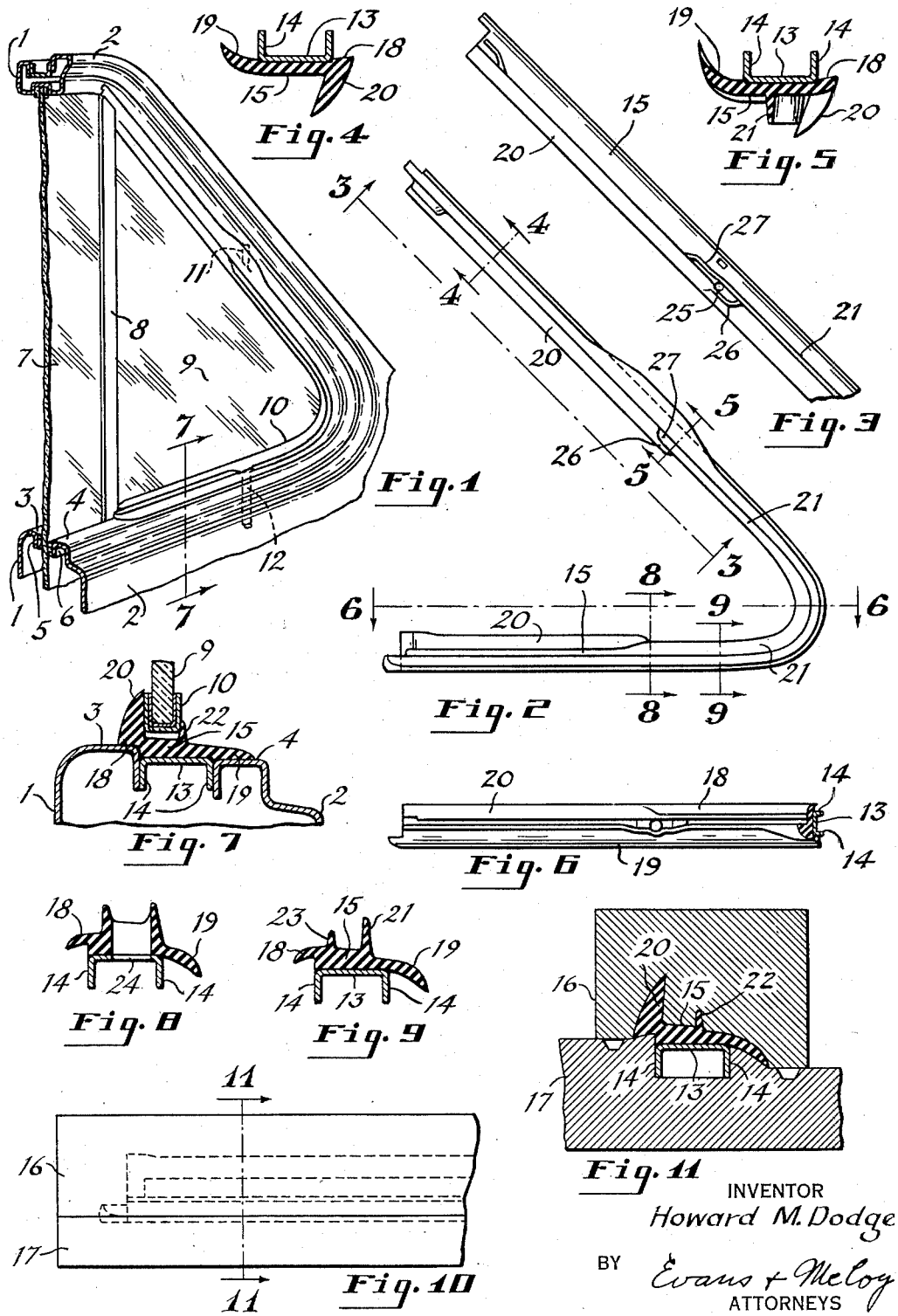

2,593,387

UNITED STATES PATENT OFFICE 2,593,387

VENTILATOR WINDOW FRAME

Howard M. Dodge, Wabash, Ind., assignor to The General Tire and Rubber Company, Akron, Ohio, a corporation of Ohio Application May 19, 1950, Serial No. 162,949

4 Claims. (Cl. 296—4.4)

This invention relates to ventilator window frames and more particularly to a ventilator frame for mounting in a window opening of an automobile door, and to the method of making the same.

The invention has for its object to provide a strong, durable and weathertight frame for the pivoted ventilator window that has an elastic and flexible rubber facing permanently affixed thereto and that is constructed to have sealing engagement both with the ventilator and with the portions of the wall in which the ventilator is mounted.

With the above and other objects in view, the invention may be said to comprise a ventilator frame such as shown in the accompanying drawings and hereinafter described, together with such variations and modifications thereof as will be apparent to one skilled in the art to which the invention pertains.

Reference should be had to the accompanying drawings forming a part of this specification in which:

Figure 1 is a sectional perspective view of a portion of the outer side of an automobile door showing the ventilator frame embodying the invention mounted in the window opening;

Fig. 2 is a side elevation of the ventilator frame;

Fig. 3 is an elevation of the interior of the forward inclined portion of the frame viewed as indicated by the arrows 3—3 in Fig. 2;

Fig. 4 is a transverse section taken on the line indicated at 4—4 in Fig. 2;

Fig. 5 is a transverse section taken on the line indicated at 5—5 in Fig. 2;

Fig. 6 is a horizontal section taken on the line indicated at 6—6 in Fig. 2;

Fig. 7 is a fragmentary vertical section taken on the line indicated at 7—7 in Fig. 2;

Fig. 8 is a vertical section taken on the line indicated at 8—8 in Fig. 2;

Fig. 9 is a vertical section taken on the line indicated at 9—9 in Fig. 2;

Fig. 10 is a fragmentary side elevation of the mold which is used to form the rubber facing of the frame and to vulcanize the same to the metal bar which forms the body of the frame; and Fig. 11 is a vertical section taken on the line indicated at 11—11 in Fig. 10.

In the accompanying drawings the invention is shown applied to an automobile door which has inner and outer sheet metal panels 1 and 2 and which has a window opening the margin of which is formed by reentrant portions 3 and 4 of the door panels. The reentrant portions 3 and 4 have inturned flanges 5 and 6 which are spaced apart to provide a recess or slot between the panel sections throughout the margin of the window opening. The major portion of the window opening is closed by a vertically sliding glass pane 7, the forward edge of which is guided by a vertical guide post 8. Forwardly of the post 8 the window opening tapers forwardly and has a triangular ventilator window 9 mounted therein. The ventilator window comprises a glass pane having a marginal metal channel 10 and is mounted to swing on vertically alined pivots 11 and 12. The ventilator window 9 is mounted in a frame the body of which is formed by a metal channel bar 13 that is bent to conform to the bottom and inclined front edge of the window opening forwardly of the post 8. The web of the channel bar 13 faces inwardly and the flanges extend outwardly and are received between the inturned flanges 5 and 6 of the door panels.

The channel bar 13 is provided with a flexible elastic rubber facing 15 which is permanently bonded to the web of the bar 13. The facing 15 is bonded to the channel bar 13 by molding the facing against the web of the channel bar in a suitable mold and vulcanizing the facing to the bar. As shown in Figs. 10 and 11, the mold may consist of upper and lower sections 16 and 17, the lower section being recessed to receive the channel bar 13 and the upper section 16 being recessed to provide a cavity to form the rubber facing 15.

The mold sections 16 and 17 are elongated and have straight elongated cavities to receive the channel bar 13 and provide a cavity in which the facing 15 is molded on and vulcanized to the exterior face of the channel web. After the facing 15 is vulcanized to the bar 13 the rubber faced bar is bent to conform to the window opening. By vulcanizing the facing to a straight bar the construction of the mold is greatly simplified and a substantial saving is effected in the cost of production.

The composition of the rubber facing 15 may be a rubber composition of a type which strongly adheres to metal when vulcanized thereon, or the metal of the bar 13 may be brass or the like to which rubber is firmly bonded when vulcanized thereon. The rubber facing 15 is wider than the channel bar 13 and has inner and outer edge portions 18 and 19 which project past the inner and outer sides of the bar 13 to cover portions of the door panels 1 and 2 adjacent the slot in which the bar 14 is mounted. The facing 15 is provided with inner ribs 20 which are adjacent the inner edge of the facing and which project into the window opening to provide stops for the rear portion of the pivoted ventilator 9, the ribs 20 extending from the ends of the bar 13 which abut the post 8 to adjacent the vertically disposed pivots 11 and 12.

Forwardly of the pivots 11 and 12 the facing 15 is provided with outer stop ribs 21 that are offset outwardly with respect to the ribs 20 and which limit the outward swinging movement of the forward end portion of the ventilator 9. The portion of the facing 15 which extends along the bottom of the window opening is provided with short relatively thin ribs 22 spaced outwardly from the stop ribs 20 over which the lower edge of the ventilator rides in moving to closed position. The portion of the facing along the bottom of the window opening forwardly of the pivot 12 has a short relatively thin rib 23 spaced inwardly from the stop rib 21 over which the forward portion of the bottom edge of the ventilator rides when the ventilator is moved to closed position. The frame bar 13 and facing 15 are provided with an opening 24 to receive the pivot 12 and with an opening 25 to receive the pivot 11.

The upper stop rib 20 is provided with a flexible extension 26 that extends past the pivot opening 25 and which is joined to the rib 21 a short distance below the pivot. The rib 21 has a flexible extension 27 that extends past the pivot and which is joined to the rib 20 a short distance above the pivot. When the ventilator is closed the flexible portions 26 and 27 of the ribs are flexed toward the ribs 20 and 21 and collapsed against the pivot 11 to provide a tight seal at the pivot. The short ribs 22 and 23 on opposite sides of the lower pivot 12 form extensions of the ribs 20 and 21 and are collapsed around the pivot by the ventilator in closing in a manner similar to the flexible ribs 26 and 27.

The frame of the present invention is positioned in a window opening by the rubber facing 15 which has sealing engagement both with the pivoted ventilator 9 and also with the inner and outer door panels to effectively seal the window when the ventilator is closed. The vertical guide post 8 provides a seat for the rear vertical edge of the ventilator and may be provided with the usual sealing strip. By reason of the bonding of the rubber facing to the rigid metal frame, the sealing ribs are accurately positioned and firmly held in proper position with respect to the pivoted ventilator. Also by reason of the firm bond between the rubber facing and the frame bar, it is unnecessary to provide any fastening means other than the rubber facing strip between the ventilator frame and the door panels.

It is to be understood that in accordance with the provisions of the patent statutes, variations and modifications of the specific devices herein shown and described may be made without departing from the spirit of the invention.

What I claim is:

1. A ventilator frame for mounting in the window opening of an automobile door and between the inner and outer door panels comprising a metal channel bar bent to conform to an end of the window opening, said bar having its web facing inwardly and its flanges projecting outwardly for reception between the door panels, and a flexible elastic rubber facing adhered to said web, said facing being wider than the bar and having opposite edge portions projecting past opposite sides of the bar to cover the edges of the door panel on opposite sides of the bar, said facing having alined window pivot receiving portions and offset ribs extending from said pivot receiving portions for engagement with opposite sides of the ventilator.

2. A ventilator frame for mounting in the tapering forward end of an automobile door and between the inner and outer door panels comprising a metal channel bar bent to provide portions disposed at an acute angle to fit the end and bottom of the window opening, said bar having its web facing inwardly and its flanges projecting outwardly for reception between the door panels, and a flexible elastic rubber facing molded on and vulcanized to the web of said bar, said facing being wider than the bar and having opposite edge portions projecting past opposite sides of the bar to cover the adjacent door panel edges, said facing having inwardly projecting stop ribs for engagement interiorly and exteriorly with the ventilator.

3. A ventilator frame for mounting in the tapering forward end of an automobile door and between the inner and outer door panels comprising a metal channel bar bent to provide portions disposed at an acute angle to fit the end and bottom of the window opening, said bar having its web facing inwardly and its flanges projecting outwardly for reception between the door panels, and a flexible elastic rubber facing molded on and vulcanized to the web of said bar, said facing being wider than the bar and having opposite edge portions projecting past opposite sides of the bar to cover the adjacent door panel edges, said facing having alined pivot receiving portions, ribs extending from the ends of said facing to said pivot receiving portions having outer ventilator engaging faces and a rib extending from one pivot portion to the other, the latter rib being offset outwardly with respect to the first mentioned ribs and having inner ventilator engaging faces.

4. A ventilator frame for mounting in a wall opening provided with a marginal recess comprising a metal channel bar bent to conform to a portion of the opening, said bar having its web facing inwardly and its flanges extending outwardly for reception in the marginal recess of the wall opening, and a flexible elastic facing adhered to said web and having inwardly projecting ventilator engaging ribs, said facing being wider than the bar and having side edge portions projecting past the side edges of said bar to cover portions of the wall adjacent the marginal recess.

HOWARD M. DODGE.

REFERENCES CITED

The following references are of record in the file of this patent:

UNITED STATES PATENTS

| Number | Name | Date |
|---|---|---|
| 2,172,091 | Scott | Sept. 5, 1939 |
| 2,184,186 | Geyer | Dec. 19, 1939 |